US008667666B2

(12) United States Patent
Sadiku et al.

(10) Patent No.: US 8,667,666 B2
(45) Date of Patent: Mar. 11, 2014

(54) METHOD FOR PRODUCING STATOR OR ROTOR WITH INTERLACED WIRE GROUPS FORMING AN INTERTWINED WAVE WINDING

(75) Inventors: Sadik Sadiku, Neuburg (DE); Keith A. Witwer, Fort Wayne, IN (US)

(73) Assignee: Elmotec Statomat Vertriebs GmbH, Karben (DE)

( * ) Notice: Subject to any disclaimer, the term of this patent is extended or adjusted under 35 U.S.C. 154(b) by 671 days.

(21) Appl. No.: 12/423,277

(22) Filed: Apr. 14, 2009

(65) Prior Publication Data

US 2009/0261683 A1    Oct. 22, 2009

(30) Foreign Application Priority Data

Apr. 17, 2008  (DE) .......................... 10 2008 019 479

(51) Int. Cl.
*H02K 15/00*  (2006.01)

(52) U.S. Cl.
USPC ................................. 29/596; 29/598; 29/606

(58) Field of Classification Search
USPC ............. 29/596–598, 732, 605–606; 242/432
See application file for complete search history.

(56) References Cited

U.S. PATENT DOCUMENTS

| 3,820,728 | A | * | 6/1974 | Pitt et al. ..................... 242/432.6 |
| 5,664,317 | A | * | 9/1997 | Ponzio et al. ................... 29/596 |
| 6,140,735 | A |   | 10/2000 | Kato et al. |
| 6,141,865 | A | * | 11/2000 | Kakutani et al. ................ 29/733 |
| 6,687,974 | B1 | * | 2/2004 | Asao et al. ...................... 29/596 |
| 6,750,581 | B2 |   | 6/2004 | Neet |
| 6,759,779 | B2 |   | 7/2004 | Neet |
| 6,826,823 | B2 |   | 12/2004 | Neet |
| 6,862,797 | B2 |   | 3/2005 | Neet |
| 7,152,306 | B2 | * | 12/2006 | Andersson et al. ............. 29/605 |
| 7,281,312 | B2 |   | 10/2007 | Sadiku et al. |
| 7,337,525 | B2 |   | 3/2008 | Ueda et al. |
| 7,703,192 | B2 | * | 4/2010 | Sadiku et al. ................... 29/596 |
| 2006/0022547 | A1 |   | 2/2006 | Sadiku et al. |

* cited by examiner

*Primary Examiner* — Minh Trinh
(74) *Attorney, Agent, or Firm* — Stites & Harbison PLLC; Douglas E. Jackson

(57) ABSTRACT

The disclosed method produces a stator or rotor having a distributed wave winding, in which the wires are associated in pairs lying with straight segments in the same slots. Head portions of two successive straight segments of each wire of a pair protrude from opposite ends of slots. For forming two wire groups, a plurality of coil windings are simultaneously created by winding up n parallel wires with intermediate spacing onto a striplike former that is rotatable about its longitudinal axis. From each of the parallel wires one straight segment and one end turn are doubled by being bent over with the wire length of a head portion, and then head portions are formed and the wires interlaced. Finally, the two wire groups are wound onto one another and thereby intertwined with one another, and then introduced as an entire intertwined wave winding strand into the stator or rotor slots.

9 Claims, 4 Drawing Sheets

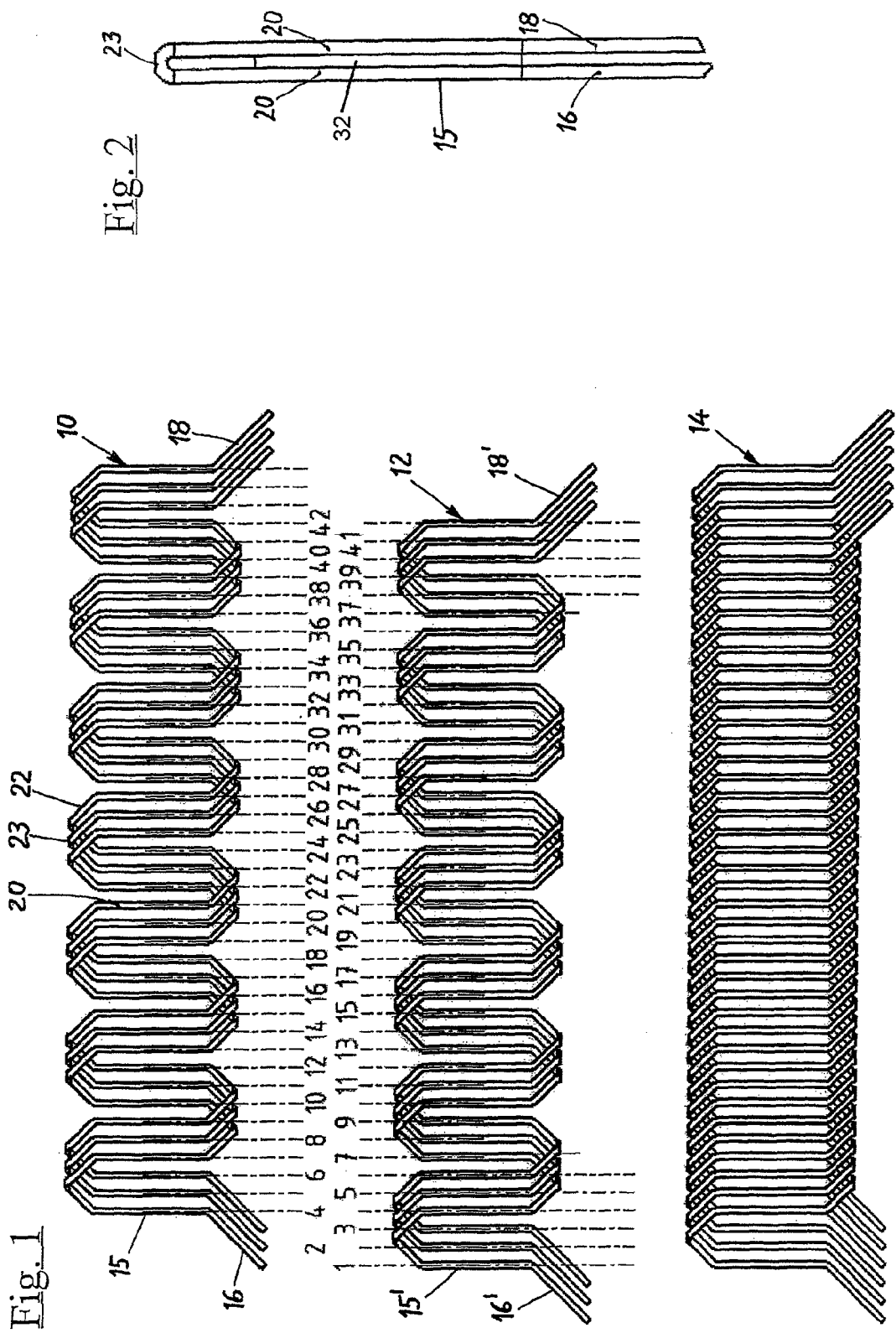

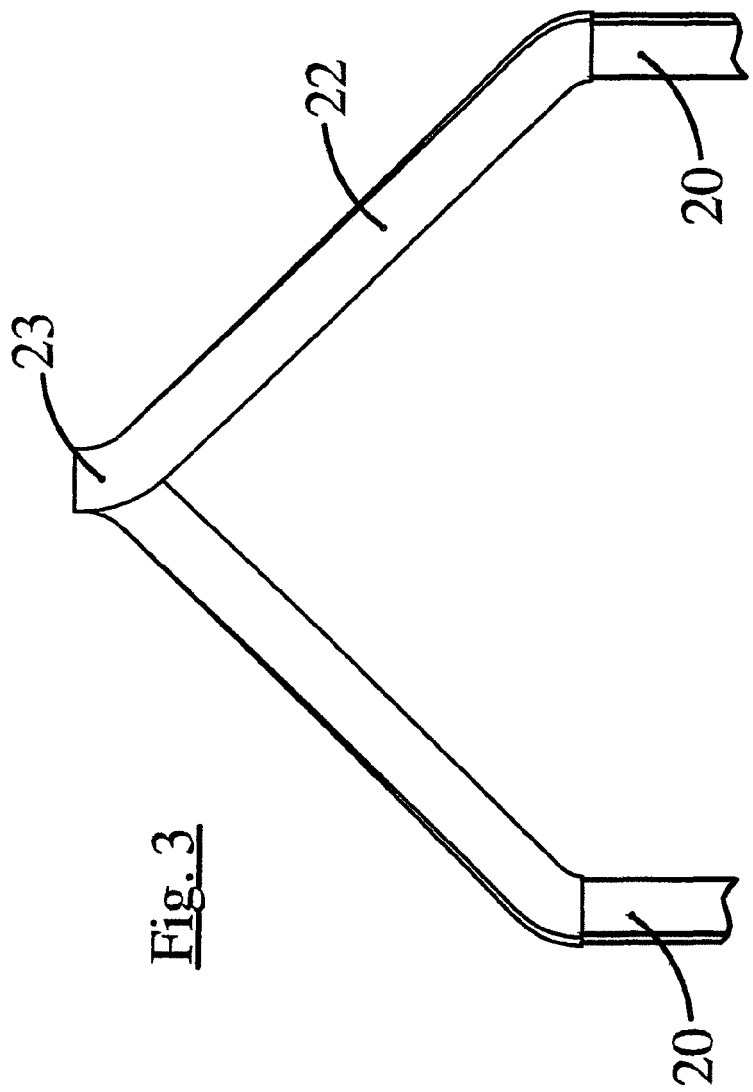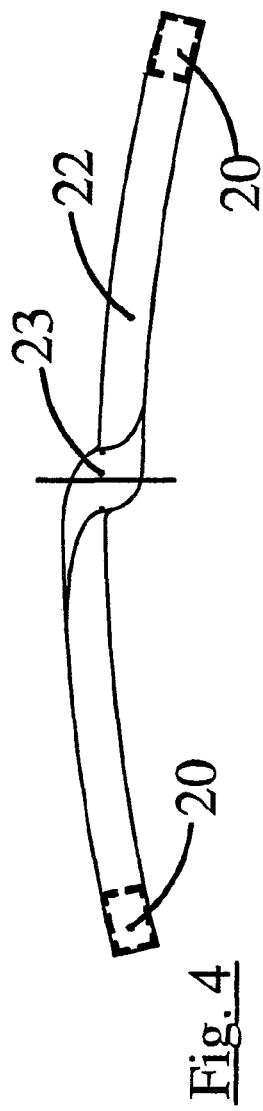
Fig. 3
Fig. 4

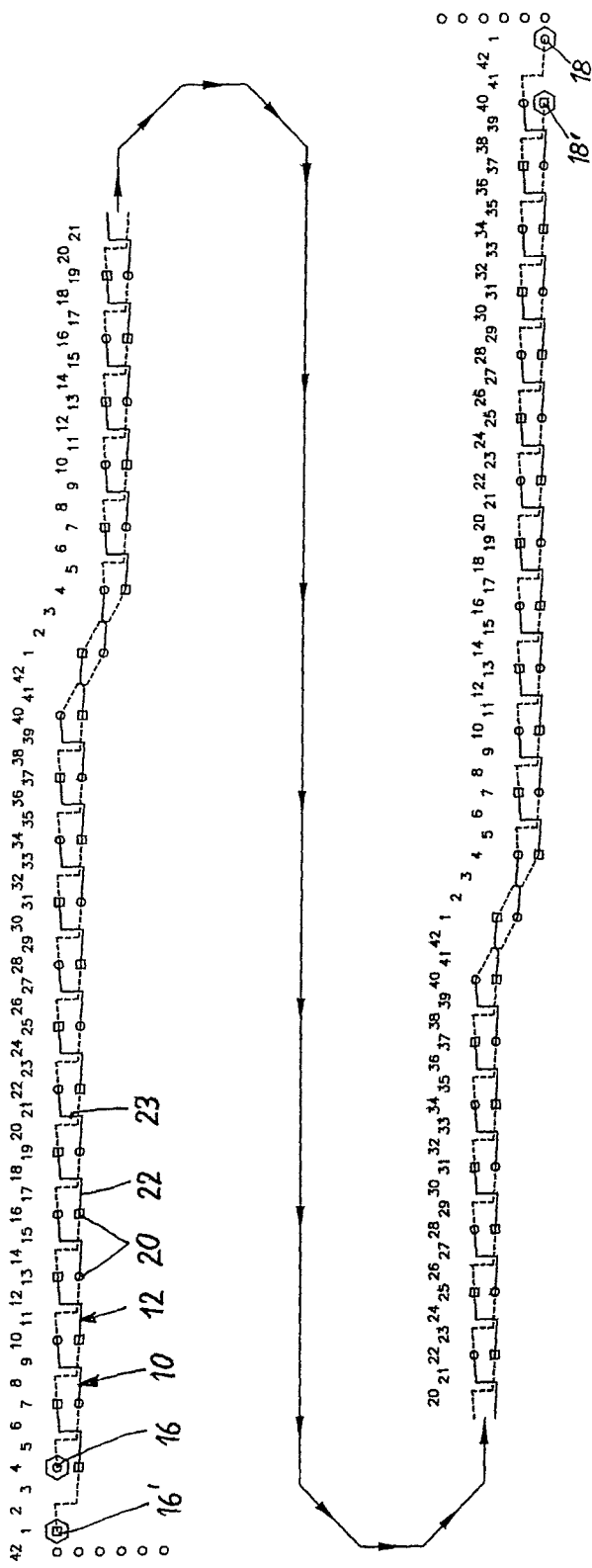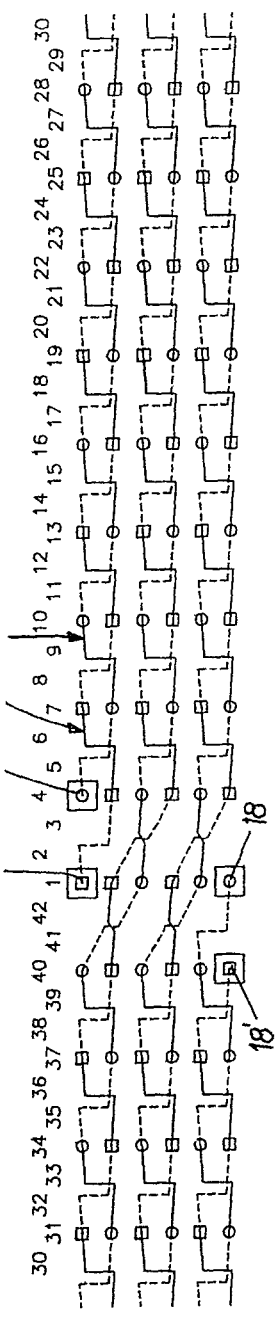
Fig. 7
Fig. 8

METHOD FOR PRODUCING STATOR OR ROTOR WITH INTERLACED WIRE GROUPS FORMING AN INTERTWINED WAVE WINDING

FIELD OF THE INVENTION

The invention relates to a method for producing a stator or rotor, i.e., electrical elements, for electrical machines, having a distributed wave winding, the wires of which wave winding are shaped continuously in wavelike fashion into straight segments introduced into the slots of the stator or rotor and head portions, each head portion joining two adjacent straight segments of one wire and protruding past an end face of the stator or rotor, in which the head portions of wires, associated in pairs occupying the same slots, protrude from opposite ends of the slots receiving two successive straight segments of the associated wires.

The invention further relates to a stator or rotor (electrical element) of an electrical machine having slots whose width is designed for the reception of a single row of straight wire segments of rectangular cross section that are oriented parallel with their radially inner and outer side faces, and having a distributed wave winding that has two wire groups, each with n interlaced wires, shaped continuously in wavelike fashion with straight segments and gable-shaped head portions, in which the wires of one wire group are associated with the wires of the other group in pairs, in such a manner that the two wires of each pair are located in the same slots and their head portions join opposite ends of successive straight segments located in the same slots.

BACKGROUND OF THE INVENTION

The invention is based on a method described in US Patent Application 2006/0022547 (now U.S. Pat. No. 7,703,192) and the stator or rotor produced by this method which published application is hereby incorporated by reference. It provides that a distributed wave winding is assembled from two separately interlaced wire groups of preferably rectangular winding wires, in which each group is created by winding on a striplike flat former, by the intersection of the wires in the head portion regions, and by ensuing flat pressing. The two winding halves pressed flat separately in one ply at the end lie in a defined plane each in the stator or rotor slots, without being intertwined/interlaced with one another. The respective winding wires, associated in pairs and located in the same slots, of the two strands are joined only by soldering on one end. Although a double or two-ply layer formed of both winding halves located one above the other is supposed to have the thickness of twice the wire thickness, at certain points three wires intersect at such close spacing that a certain lack of uniformity in thickness occurs, and this deficiency increases when there are a plurality of layers.

Distributed wave windings in which all the winding wires are interlaced with one another to form one coherent strand are described in U.S. Pat. Nos. 6,750,581 B2, 6,759,779 B2, 6,826,823 B2 and 6,862,797 B2. No production method is disclosed, but if, as is normally desired, the prefabricated wave winding shall extend multiple times about the circumference of a stator or rotor and thus form a plurality of layers, in those areas where the transition from one layer to the next takes place, an irregularity must be incorporated into the strand of interlaced wires, making production by machine more difficult.

From European Patent Disclosure EP 1 469 579 A1, it is furthermore known to produce a distributed wave winding for a stator or rotor by winding all the winding wires that form a two-ply layer parallel to one another onto a former of hexagonal cross section in a single winding operation, the former having two parallel side faces, which are provided with transverse slots and are joined on both long edges by gable-shaped end faces. The winding operation thus proceeds helically along the former, but the inclination is limited to the unslotted, gable-shaped end faces, while the winding wires in the slots of the parallel side faces extend without a slope, transversely to the longitudinal center axis of the former. Each time the parallel winding wires are wound about the former, some of the wires are placed in slots located diametrically opposite other slots that have been occupied earlier during the same winding operation. Once a certain number of windings has been reached, the multi-part former is reduced in its cross section and pulled out of the coil that has been formed. After that, the coil of hexagonal cross section is pressed flat in two plies, and the straight wire segments created on both side faces of the former are pressed against one another.

In this last-described winding method, the wires are placed continuously, with a constant inclination, onto the gable-shaped end faces of the former. Because of the residual intrinsic elasticity, however, they do not rest flat there, nor are they pressed from outside against these faces, and they are not retained in slots. The bending of the wires about the edges that define the gable-shaped end faces, in conjunction with the bending for attaining the axial inclination of the wire windings, causes torsion of the rectangular wires throughout the area of the head portion, which proves harmful in the phase between when the coil is removed from the former and the flat pressing is done. Normally, in this known winding method, the outer side face of a wire, resting on a side face of the former, should also be located on the outside over the entire length of a head portion. However, both the torsional stress in the wire and the bending edges extending obliquely to its longitudinal edges cause twisting about the longitudinal axis of the wire and bends, so that upon the flat pressing, the wire portions located one above the other or intersecting one another are in part pressed with their side edges instead of with the side faces, against one another, and the parallel course of the wires in the head portion region is not assured, either.

BRIEF SUMMARY OF THE INVENTION

It is therefore the object of the invention to make a stator or rotor of the type defined at the outset available that has an entirely intertwined/interlaced, distributed wave winding with a uniform wire course and a minimal two-ply layer thickness, in the head portions as well, and to make a suitable production method available for such a stator or rotor.

The above object is attained in terms of the method in that for forming two wire groups, initially interlaced separately and then intertwined/interlaced with one another, in each case a plurality of coil windings are simultaneously created by winding up n parallel wires, paid out from a wire guide, with intermediate spacing onto a striplike former that is rotatable about its longitudinal axis, in that for a stator or rotor having a number of slots divisible by 2 n, that are to be occupied by the wave winding, in alternation in a work step A, from each of the parallel wires on the former having a predetermined intermediate spacing corresponding to the spacing of the stator or rotor slots, one straight segment and one end turn, doubled by being bent over and having the wire length of a head portion are created; and in a work step B, the straight segments formed in work step A, while maintaining their intermediate spacing, together with the adjoining first end of the respective associated end turns, and the wire guide, together with the second end of these end turns are displaced axially along the axis of rotation of the former relative to one another by n times the predetermined intermediate spacing in a predetermined direction and as a result head portions are formed;

until after multiple repetition of work steps A and B, the straight segments for the last n stator and/or rotor slots are also created on the former;

and then the two individually prefabricated interlaced wire groups are wound onto one another in an axial relative position in which the straight segments created from associated wires on opposite sides of the striplike former are made to coincide, and in this state are introduced as an entire coherent wave winding into the stator or rotor slots in the direction transversely to their longitudinal extent.

The invention offers the advantage that the wave winding can be assembled from two wire groups that are to be prefabricated each in one ply, with straight segments offset transversely from the central plane, and can be interlaced with all the wires. The head portions alternatingly jump from a radially inner ply to a radially outer ply and back again, and thus rest obliquely to the circumferential direction of the stator or rotor. Nevertheless, the wires are bent only locally at the transitions from the straight segments to the head portions and at the apexes thereof, specifically preferably only about bending axes extending longitudinally of the strand and transversely thereto. In this way, rectangular wires too can be aligned uniformly in the head portions, so that after assembly, they point radially outward and inward with diametrically opposed side faces. By the deformation at the apex of the head portions, which has the effect that in top view on one side of the apex one side face and on the other side the diametrically opposed side face of the rectangular wire forms the outer face of the head portion, the wire becomes plastically deformed and after that maintains its shape.

In a preferred feature of the invention, each of the two wire groups that are interlaced separately has from two to five times as many straight segments as the stator or rotor has slots, and after both wire groups have been intertwined by winding upon one another the combined strand has a continuous structure and pattern between the respective second and next-to-last straight segments, such that the head portions of two associated wires that are intended for the same slots intersect, upon each progression from one slot to the next, in projection onto a plane located transversely to the longitudinal direction of the slots. This method is favorable from a manufacturing standpoint, since the wave winding can be continuously uniformly shaped, without the discontinuity shown for instance in U.S. Pat. No. 6,750,581 B2 at the transition from one two-ply layer to the next.

Normally, each wire group interlaced separately will be pressed flat individually with n wires, and then the two wire groups will be wound one above the other. However, the possibility also exists of first winding the two wire groups, which have been prefabricated as flat as possible, one above the other and then to press them flat while in mutual contact.

A stator or rotor produced by the method described above is also provided. It is distinguished by a precisely parallel orientation not only of the side faces radially adjoining one another of the straight segments but also of the head portions at the intersections, as well as by their precise positioning, so that the thickness measured in the radial direction of a two-ply wire layer is no greater in the region of the head portions than in a slot.

BRIEF DESCRIPTION OF THE DRAWINGS

Below, one exemplary embodiment of the invention is described in further detail in conjunction with the drawings.

FIG. 1 shows two individually prefabricated, wave-shaped wire groups interlaced separately, in a side view, each comprising three wires, for a distributed wave winding of a stator having 42 slots, as well as a side view of a wave winding, assembled by intertwining the two wire groups by winding them onto one another, in the flatly spread-out state;

FIG. 2 is an end view of one of the wire groups of FIG. 1, on a larger scale;

FIG. 3 is a side view of a head portion of one of the wire groups of FIG. 1, on a greatly enlarged scale;

FIG. 4 is an axial top view onto a head portion of one of the wire groups of FIG. 1, after being introduced into a stator, on a greatly enlarged scale;

FIG. 7 is a winding diagram of a three-layer distributed wave winding of a pair of wires for a stator with 42 slots, in a developed view; and FIG. 8 is the winding diagram of the distributed wave winding of FIG. 7 after the introduction, in three two-ply layers, into a stator.

DETAILED DESCRIPTION OF THE INVENTION

Figure 6:
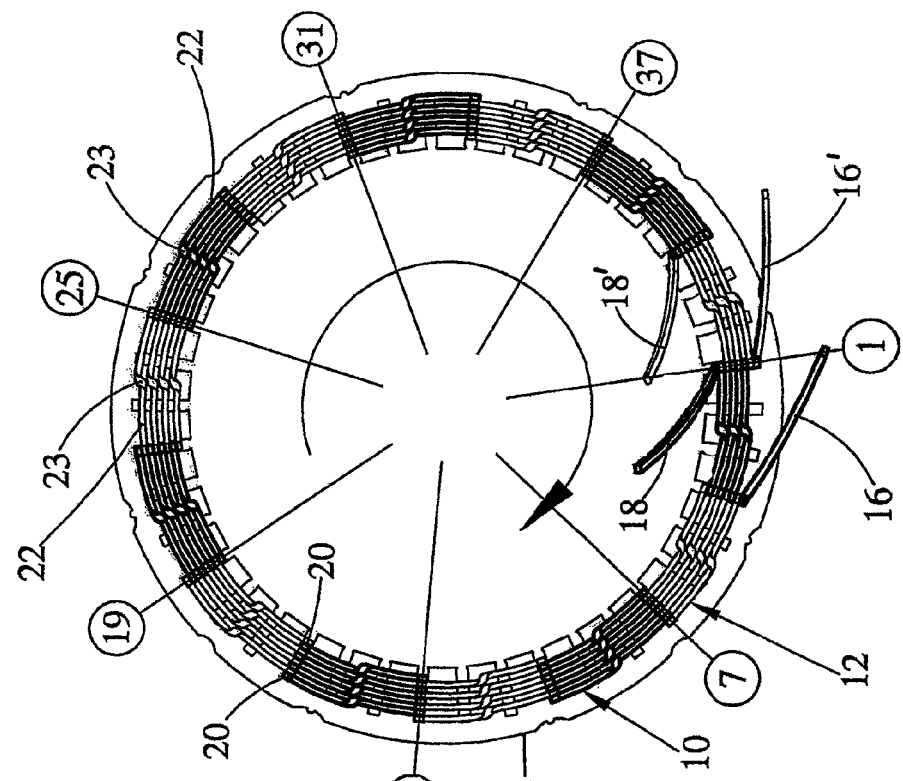
FIGS. 5 and 6 are top views on the face ends of a stator having 42 slots after the insertion of one of three pairs of wires of a distributed wave winding that extends two times around the circumference and forms two double layers.

As shown in FIG. 1, first, two wire groups 10 and 12, comprising parallel wires formed and interlaced with one another, are produced, which are then put together and intertwined by winding onto one another to form a wave winding identified in its entirety by reference numeral 14, which is introduced into a stator or rotor, i.e., an electrical element for an electrical device hereafter exemplarily depicted as stator 30.

The two wire groups 10 and 12, in this example, match identically, but may also have differently shaped head portions. They each comprise three parallel wires 15, 15' whose beginnings are marked 16 and 16' and whose end is marked 18 and 18', respectively. In each of the two wire groups 10, 12, the three wires 15, 15' extend in wavelike fashion between their respective beginning and end and in the process form rectilinear straight segments 20, to be introduced into the stator or rotor slots, and head portions 22 which join two adjacent straight segments 20 of the same wire at the ends. In the finished state of a stator, the head portions 22 protrude past the face ends of the stator lamination packet.

Each wire group 10 and 12 is shaped in wavelike fashion, in that the three wires 15, 15' as described in US Patent Application 2006/0022547, now U.S. Pat. No. 7,703,192 (see especially FIGS. 10A-10I), are wound simultaneously and parallel to one another onto a rotationally drivable flat or striplike former 32 shown in FIG. 2 (or see similar former 20 in the above noted reference), which also includes two retractable bolts (see #26 in the above noted reference) that form the head portions 22. During the winding motion, which is done with interruptions (periods when no winding occurs), the wire guide (see #30 in the above noted reference) is axially fixed relative to the former, but each time the wires 15 have been guided about one of the aforementioned bolts and as a result the bend at the apex of three end turns, which thereafter become head portions 22, has been shaped, the wire guide and the former, after the retraction of the bolt, are axially displaced relative to one another, and thereby the legs of the end turns are spread apart to form the head portions 22. It can be seen from FIG. 1 that in the head portions 22 the legs now are in an intersecting or crossing over position. It can also be seen from FIG. 1, that the first wire 15 of the upper head portions crosses over the two other parallel wires 15, and the middle wire 15 crosses over the third wire 15. The situation is a reverse in the lower head portions 22. There, the third wire 15 crosses over the first and second wires 15, and the middle wire 15 crosses over the first wire 15. In this way, after being stripped from the flat former 32, the three wires 15 are interlaced with one another and can be handled as a single coherent wire group or strand 10 and 12, respectively.

The flat, striplike former 32, for reasons of strength, has a certain thickness. But in the case of the wave winding to be produced in accordance with US Patent Application 2006/0022547, now U.S. Pat. No. 7,703,192, all the straight segments 20 of one wire group 10 or 12 should be located in the same flat plane. This is desired so that later in the radial slots of a cylindrical stator or rotor, the straight segments will be located at the same radius. To achieve this the wire groups 10, 12, after the wavelike shaping on the former 32, are pressed as flat as possible into a common plane. But normally this flat pressing is not entirely successful, since the intersecting (cross over) points of the wires in the head portions 22 are an obstacle to-it this flat pressing.

In the known method of US Patent Application 2006/0022547, now U.S. Pat. No. 7,703,192, the two flat-pressed wire groups 10 and 12 are simply placed one above the other in the longitudinal direction with the offset shown of their beginnings 16, 16' and ends 18, 18'. In this simple layering they are introduced in the manner described for instance in U.S. Pat. No. 7,281,312 B2 and shown in FIGS. 8 through 11 thereof into a stator or rotor that has slots open radially inward.

However, the present invention is distinguished over this prior art in that the wire groups 10 and 11, normally also after a flat-pressing operation, are intertwined/interlaced with one another in the relative position shown in FIG. 1 by intertwined wave winding 14. This intertwining of wire groups 10 and 12 is accomplished by being wrapped around one another, so that the entire wave winding 14 is one coherent wire group or strand, which can then in accordance with U.S. Pat. No. 7,281,312 B2 be introduced into a stator lamination packet. Winding the two wire groups 10 and 12 around one another is necessary in order to make respective paired straight segments 20 of the wire groups 10 and 12 coincide. For instance, the first three straight segments 20 in FIG. 1—beginning at the left—of the wire group 10 that have been shaped on the back side of the flat former 32 are made to coincide with the fourth, fifth and sixth straight segments of the wire group 12. These three last-mentioned straight segments have been shaped on the front side of the flat former 32. Once the straight segments 4 through 6 of the wire group 12 have been placed on the straight segments 1 through 3 of the wire group 10, the wire group 10 must be placed onto the top side of the wire group 12 by means of a winding step, in order to place the straight segments 4 through 6 of the wire group 10 onto the straight segments 7 through 9 of the wire group 12. Next, by a further winding motion, which is very easily done by hand, but can also be done using a very flat former, the wire group 12 is placed over the wire group 10, in order to place the straight segments 10 through 12 of the wire group 12, shaped on the front side of the former onto the straight segments 7 through 9, counted from the left, of the wire group 10 that have been shaped on the back side of the former.

It can easily be seen that after all the straight segments of the wire groups 10 and 12 have been superimposed on one another (intertwined), an optimally thin two-ply layer of the wave winding 14 is obtained. If the straight segments 20, shaped in accordance with FIG. 2 initially with a certain intermediate spacing corresponding to the thickness of the former 32, have been moved closer together by pressing the wire groups 10 and 12 flat enough, they are then directly side by side, with no spacing between them, as shown in the end view of FIG. 2. In the intertwined/interlaced state of the two wire groups 10 and 12, the result is then a two-ply layer, which is precisely as thick as two straight wire segments 20 located flat one above the other. Since the head portions 22 extend obliquely between the two plies, this two-ply layer is no thicker, even in the region of the head portions.

The wave winding selected as the exemplary embodiment in FIG. 1 is intended for a stator 30 having 42 slots. It is understood that by the same production method, a distributed wave winding with two wire groups each with only two wires, but also with for instance from four to eight or even more wires per group, can be produced. It is recommended that, as shown in FIG. 1, the two wire groups 10 and 12 be superimposed offset in the longitudinal direction by the number of wires of each group and that the wire ends 18 and 18' be connected electrically to one another, so that the current in both straight segments located in the same slot has the same direction, and the beginnings 16 and 16' of the wires 15, 15' are located directly side by side on the same side of the stator 30.

FIGS. 3 and 4 show a head portion 22 in side view and top view, respectively, on a larger scale. It can be seen that the wire 15 has first been bent over onto itself by 180°. After that, the two legs of the head portion 22 have been spread, so that at the bending point, a lateral bend about an axis located essentially transversely to the first bending axis has also been made. The bending operations at the apexes, marked 23, of the gable-shaped head portions 22 result in a plastic deformation so that the attained shape is preserved. In addition, FIG. 4 clearly shows that the thus-deformed head portions 22 are naturally, like the straight segments 20 joined by them, located in two directly adjacent plies. The transition between the two plies is located at the apex 23 of the head portions 22.

In the exemplary embodiment of FIG. 1 the wire groups 10 and 12 and the wave winding 14 put together from them have only so many straight segments that with them, in a stator with 42 slots, only a single two-ply layer can be produced. In other words, each wire 15 extends only once around the circumference, and there are only two straight segments in each slot.

FIGS. 5 through 8 additionally show a four-ply winding diagram for a stator 30, also with 42 slots, in which for the sake of simplicity only a single pair of wires 15, 15' is shown, which pair is located in the slots 1, 4, 7 . . . 37, and 40. The complete distributed wave winding actually also includes a second pair of wires 15, 15', which is located in the slots 2, 5, 8 . . . 38, and 41, as well as a third pair of wires 15, 15', which is located in the slots 3, 6, 9 . . . 39, and 42. By comparing the two end views of the stator 30 in FIGS. 5 and 6, it can be seen that on each of those circumferential portions where the head portions 22 of one wire (e.g., 15) are located on one end, the other wire (e.g., 15') has its head portions 22 on the other end of the stator 30. The wire beginnings 16 and 16' emerge radially outward from the slots 1 and 4. The wire ends 18 and 18' protrude radially inward from the slots 1 and 40, respectively, and are located on the same axial end of the stator 30 as the wire beginnings 16, 16'. They have a short circumferential spacing and can therefore easily be electrically connected to one another, so that in the finished state, for each pair of wires 15, 15' associated with one another, only two external connections or terminals are needed.

Figure 5:
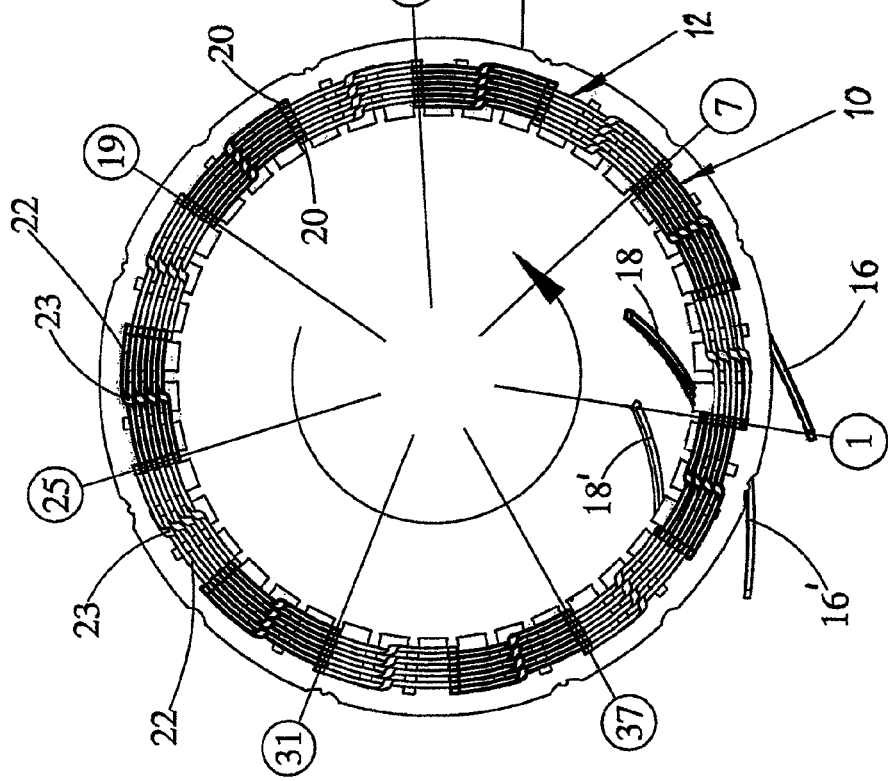

FIGS. 5 and 6 already show the uniform shape of the head portions 22 in all the layers over the entire circumference on both ends of the stator 30. This uniformity, even at the transitions from one two-ply layer to the next, can be explained in conjunction with FIGS. 7 and 8. FIG. 7 shows a developed view, that is, the stretched-out outset state of a wave winding 14 of the invention, here comprising only a single pair of associated wires, or in other words FIG. 7 shows the same situation as in FIGS. 5 and 6. The numbers of the slots are indicated for three passes all the way around the circumference of the stator. Small circles represent straight segments of the wire 15 of group 10, and small squares represent straight segments of the wire 15' of group 12. It can be seen that between slots 4 and 7 a solid line connects the straight segments, marked with a square, of the wire 15' of group 12. Looking toward the face end of the stator 30 shown in FIG. 6, these are the head portions 22, marked by thin lines, between the slots 4 and 7. At the same time, in FIG. 7, a dashed line connects the straight segments, marked by small circles, of the wire 15 of group 10, which is represented by only a single wire. Thus the head portions 22, which are not visible looking toward the face end of the stator 30 shown in FIG. 6, are made apparent on the other end of the stator 30. Accordingly, in FIG. 5, between slots 4 and 7, the head portions of the wire group 10 are shown, marked with heavier lines.

Thus FIGS. 7 and 8 show developed views of projections of the head portions 22, located on the opposite ends of the stator 30, onto a transverse plane of the longitudinal center axis of the stator 30. The solid lines symbolize the head portions 22 on the connection side of the stator 30 that are visible to the observer in FIG. 6, and the dashed lines symbolize the head portions 22 which are invisible to the observer, on the opposite face end of the stator 30. Both in the developed view of three two-ply layers in FIG. 7 and in the view in FIG. 8, where the three two-ply layers are shown one above the other, it can be seen that the solid lines and the dashed lines alternate and intersect. It should be stressed especially that even where the transitions from the first to the second layer and from the second to the third layer are located, the solid lines and the dashed lines, which symbolize the head portions 22 on axially opposite circumferential portions of the stator 30, intersect and alternate quite regularly, in a way that is no different from how they behave in the other circumferential portions as well. The uniformity of the winding diagram of FIGS. 7 and 8 is confirmation of the fact that wire groups 10, 12 are uniformly wavy and uniformly interlaced separately and intertwined/interlaced with one another, regardless of the number of wires 15, 15' and the number of slots. As long as the number of slots is divisible by twice the number of wires of one wire group, a very uniformly wound stator or rotor as in FIGS. 5 and 6 can be created.

For the industry, the precision of shaping and laying of the wires is just as important as the uniformity of the winding diagram of FIGS. 7 and 8. Therefore these wires intersect one another only at the predetermined points and are oriented uniformly with their rectangular cross section, or in other words are placed against one another flatly and not skewed. This can be attained with the proposed production method, with two individually prefabricated, single-ply wire groups 10, 12, in which, because of the described shaping of the apexes 23 of the head portions 22, both the head portions and the straight segments 20 can be created with a uniform orientation of the side edges of the wires 15. After that, it is no problem for the straight segments and head portions, in this way oriented precisely, of the two wire groups 10, 12 to be placed, intertwined/interlaced with one another, one above the other and then, while maintaining the uniform orientation of the wires, to introduce them into slots of a stator or rotor that are open radially outward or inward. This may also, in extreme, for instance be a stator or rotor of an electric linear motor.

The invention claimed is:

1. A method for producing a wave wound electrical element of an electrical machine,
   the produced electrical element having a distributed wave winding of intertwined wire groups which wire groups have interlaced wires,
   the wires of which wave winding are
   i) shaped continuously in wavelike fashion into
      a) straight segments which are introduced into slots of the electrical element and
      b) head portions with each head portion joining two adjacent straight segments of one wire and protruding past an associated first or second end face of the electrical element, and
   ii) associated in pairs whose straight segments occupy the same slots but whose head portions protrude from opposite ends of the slots receiving two successive straight segments of the associated wires,
   said method comprising the steps of:
   forming two interlaced wire groups separately, said forming step for each wire group including the steps of
      winding up n parallel wires with intermediate spacing onto a striplike former that is rotatable about a longitudinal axis thereof, said winding up step, for an electrical element having a number of slots divisible by 2 n that are to be occupied by the wave winding, including the steps of
         (i) spacing each of the parallel wires on the former with a predetermined intermediate spacing corresponding to a spacing of the slots of the electrical element,
         (ii) bending over so as to be doubled over one straight segment and forming a first end turn for one head portion of each of the parallel wires; and
         (iii) pausing of the rotational winding movement and axially displacing the straight segments of each wire group formed in said spacing and bending steps while maintaining the intermediate spacing thereof, together with the adjoining first end of the respective associated end turn relative to a second end of the respective associated end turn, along the axis of rotation of the former by n times the predetermined intermediate spacing in a predetermined direction so that the end turns form head portions; and
         (iv) repeating steps (i), (ii) and (iii) for the straight segments for any intermediate slots and finally for last n slots on the former to form each of the two individually interlaced wire groups;
   winding the two individually interlaced wire groups onto one another in an axial relative position in which the straight segments, created from associated wires on opposite sides of the striplike former, are made to coincide in a relative position in which the straight segments of the wires associated in pairs, in successive slots to be occupied thereby, alternatingly assume a radially outer position and a radially inner position so that the two interlaced wire groups form an intertwined wave winding; and introducing the intertwined wave winding into the slots of the electrical element in a direction transversely to a longitudinal extent of the slots to form the wave wound electrical element.

2. The method as claimed in claim 1, 
wherein each of the two individually interlaced wire groups has from two to five times as many straight segments as the electrical element has slots, and
wherein the winding step of the two individually interlaced wire groups with one another includes the step of continuously shaping and putting together the two interlaced wire groups such that between the respective second and next-to-last straight segments the head portions of two associated wires that are intended for the same slots intersect, upon each progression from one slot to the next, in projection onto a plane located transversely to the longitudinal direction of the slots.

3. The method as claimed in claim 1, further including the step of pressing flat the interlaced wire groups one of individually before the winding step or together after the winding step to form the intertwined wave winding.

4. The method as claimed in claim 3, wherein the pressing flat step separately presses flat each interlaced wire group only to such an extent that in an end view of each interlaced wire group, two straight segments joined by a head portion rest side by side with one of no intermediate spacing or with only minimal intermediate spacing.

5. The method as claimed in claim 1,
wherein in said winding up step the interlaced wire groups are formed from parallel, identically oriented wires of rectangular cross section,
wherein said bending over step includes the step of
  (i) placing the wires with a side face thereof onto the former, and
  (ii) bending the wires on the former by 180° about a first bending axis located parallel to the longitudinal center axis of the former to form end turns, and
wherein said axially displacing step includes the step of bending the legs thus formed in a region of this bend and at ends of each of the end turns about bending axes that are transverse to the first bending axis such that in a side view of the striplike former gable-shaped head portions are formed.

6. The method as claimed in claim 5, wherein the placing step includes the step of selecting the rectangular wires used to have an overall width measured in the longitudinal direction of the former, taking into account slot or wire insulators and a play necessary for the introduction of the wires into the slots, that fits a slot width of the former.

7. A method for producing a wave wound electrical element of an electrical machine, said method comprising the steps of:
forming two interlaced wire groups separately, said forming step for each wire group including the steps of
  shaping n parallel wires with intermediate spacing into a wavelike pattern including straight segments which are to be introduced into slots of the electrical element and head portions which join two adjacent straight segments of one wire and which are to protrude past an associated first or second end face of the electrical element, and
  repeatedly bending over the n parallel wires so that each wire is doubled over a preceding straight segment thereof to form an end turn of a head portion therebetween, and then axially displacing one end of each end turn of each wire relative to the other end so that relative to successive slots to be occupied thereby radially inner and outer ones of the straight segments are formed;
intertwining the two individually interlaced wire groups by winding the longitudinal center axes thereof around one another and with an axial relative position in which the radially inner straight segments of each of the interlaced wire groups are made to coincide with and be positioned inwardly from the radially outer straight segments of each of the interlaced wire groups to form an intertwined wave winding; and
introducing the intertwined wave winding into the slots of the electrical element in a direction transversely to a longitudinal extent of the slots to form the wave wound electrical element.

8. The method as claimed in claim 7, further including the step of pressing flat the interlaced wire groups one of individually before the winding step or together after the winding step to form the intertwined wave winding.

9. The method as claimed in claim 8, wherein the pressing flat step separately presses flat each interlaced wire group only to such an extent that in an end view of each interlaced wire group, two straight segments joined by a head portion rest side by side with one of no intermediate spacing or with only minimal intermediate spacing.

* * * * *